United States Patent
McEldowney et al.

(10) Patent No.: US 10,969,599 B1
(45) Date of Patent: Apr. 6, 2021

(54) POLARIZATION CONVERSION USING GEOMETRIC PHASE AND POLARIZATION VOLUME HOLOGRAM OPTICAL ELEMENTS

(71) Applicant: FACEBOOK TECHNOLOGIES, LLC, Menlo Park, CA (US)

(72) Inventors: Scott Charles McEldowney, Redmond, WA (US); Babak Amirsolaimani, Redmond, WA (US); Lu Lu, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 217 days.

(21) Appl. No.: 16/224,760

(22) Filed: Dec. 18, 2018

(51) Int. Cl.
- *G02B 27/28* (2006.01)
- *G02B 5/18* (2006.01)
- *G02B 5/30* (2006.01)
- *G02B 5/32* (2006.01)

(52) U.S. Cl.
CPC ............ *G02B 27/286* (2013.01); *G02B 5/18* (2013.01); *G02B 5/3016* (2013.01); *G02B 5/3025* (2013.01); *G02B 5/32* (2013.01)

(58) Field of Classification Search
CPC .......... G02B 5/18; G02B 5/32; G02B 5/3016; G02B 5/3025; G02B 27/286
See application file for complete search history.

(56) References Cited

U.S. PATENT DOCUMENTS

| 5,980,041 A | 11/1999 | Strachan | |
|---|---|---|---|
| 9,454,010 B1 | 9/2016 | Passmore et al. | |
| 2008/0278675 A1* | 11/2008 | Escuti | G02B 27/283 349/201 |
| 2014/0285878 A1* | 9/2014 | Escuti | G02F 1/13363 359/352 |
| 2015/0247617 A1* | 9/2015 | Du | G02F 1/13362 362/19 |
| 2016/0011353 A1* | 1/2016 | Escuti | G02B 5/3083 359/15 |

(Continued)

OTHER PUBLICATIONS

Dudley et al., "Generating and measuring nondiffracting vector Bessel beams", *Optics Letter*, vol. 38, No. 17, Sep. 1, 2013, 4 pgs.

(Continued)

*Primary Examiner* — Cara E Rakowski
(74) *Attorney, Agent, or Firm* — Morgan, Lewis & Bockius LLP (57) ABSTRACT

A device includes a first optical element configured to receive first light in a first direction. The first light includes a first component having a first circular polarization and a second component having a second circular polarization. The first optical element is also configured to convert the first component of the first light into second light having the second circular polarization and output the second light in a second direction. The first optical element is further configured to convert the second component of the first light into third light having the first circular polarization and output the third light in a third direction. The device also includes a second optical configured to receive and transmit the second light and to receive the third light and convert to the third light into fourth light having the second circular polarization.

20 Claims, 9 Drawing Sheets

(56) References Cited

U.S. PATENT DOCUMENTS

2018/0046859 A1 2/2018 Jarvenpaa

OTHER PUBLICATIONS

Dudley et al., "Generation and measuring non-diffracting vector Bessel beams", *Proc. of SPIE*, vol. 8999, 89990K, 2014, 7 pgs.

Escuti et al., "39.4: Polarization-independent switching with high contrast from a liquid crystal polarization grating", *SID 06 Digest*, 2006, 4 pgs.

Escuti et al., "A Polarization Independent Liquid Crystal-Spatial-Light Modulator", *Proc. of SPIE*, vol. 6332, No. 63320M-1, 2006, 9 pgs.

Escuti et al., "Optical-strain characteristics of anisotropic polymer films fabricated from a liquid crystal diacrylate", *Journal of Applied Physic*, vol. 95, No. 5, Mar. 1, 2004, 5 pgs.

Escuti et al., "P-36: Polarization-Independent Modulation for Projection Displays Using Small-Period LC Polarization Gratings", *SID IDRC 06*, 2006, 4 pgs.

Escuti et al., Simplified Spectropolarimetry Using Reactive Mesogen Polarization Gratings, *Proc. of SPIE*, vol. 6302, No. 630207, 2006, 12 pgs.

Gokce et al., "Femtosecond pulse shaping using the geometric phase", *Optic Letters*, vol. 39, No. 6, Mar. 15, 2014, 4 pgs.

GP Lens Modeling Notes for Zemax, *ImagineOptix Corporation*, Sep. 1, 2014, 6 pgs.

Hornburg et al., "Multiband retardation control using multi-twist retarders", *Proc. of SPIE*, vol. 9099, No. 90990Z-1, 2014, 9 pgs.

Hornburg et al., "Wide color gamut multi-twist retarders", *Proc. of SPIE*, vol. 9384, No. 9384-93840W, 2015, 11 pgs.

Huang et al., "Waveguide holography and its applications", Proc. SPIE 1461, Practical Holography V, Jul. 1, 1991, 11 pgs.

Jone et al., "P-209: Evaluation of Projection Schemes for the Liquid Crystal Polarization Grating Operating on Unpolarized Light", *SID 06 Digest*, 2006, 4 pgs.

Kim et al., "Demonstration of large-angle nonmechanical laser beam steering based on lc polymer polarization gratings", *Proc. of SPIE*, vol. 8052, No. 80520T-2, May 23, 2011, 12 pgs.

Kim et al., "Efficient and monolithic polarization conversion system based on a polarization grating", *Applied Optics*, vol. 51, No. 20, Jul. 10, 2012, 6 pgs.

Kim et al., "Fabrication of ideal geometric-phase holograms with arbitrary wavefronts", *Optica*, vol. 2, No. 11, Nov. 4, 2015, 7 pgs.

Kim et al., "Nonmechanical laser beam steering based on polymer polarization gratings: design optimization and demonstration", IEEE, *Journal of Lightwave Technology*, vol. 33, No. 10, May 15, 2015, 10 pgs.

Kim et al., "Snapshot imaging spectropolarimeter utilizing polarization gratings", *Proc. of SPIE*, vol. 7086, No. 708603-1, 2008, 10 pgs.

Kim et al., "Wide-angle nonmechanical beam steering with high throughout utilizing polarization gratings", *Applied Optics*, vol. 50, No. 17, Jun. 10, 2011, 4 pgs.

Kim et al., "Wide-angle, nonmechanical beam steering using thin liquid crystals polarization gratings", Proceedings of the IEEE, vol. 7093, No. 709302-1, 2008, 12 pgs.

Komanduri et al., "18.3: Late-News Paper: Polarization-independent Liquid Crystal Microdisplays", *SID 08 Digest*, 2008, 4 pgs.

Komanduri et al., "34.4: Late-News Paper: Polarization-independent Projection Systems using Thing Film Polymer Polarization Gratings and Standard Liquid Crystal Microdisplays", *SID 09 Digest*, 2009, 4 pgs.

Komanduri et al., "A High Throughput Liquid Crystal Light Shutter for Unpolarized Light using Polymer Polarization Grating", *Proc. of SPIE*, vol. 8052, No. 80520R-1, 2011, 10 pgs.

Komanduri et al., "Elastic continuum analysis of the liquid crystal polarization grating", *Physical Review A*, vol. 76, No. 021701, Aug. 8, 2007, 8 pgs.

Komanduri et al., High efficiency reflective liquid crystal polarization gratings, *Applied Physics Letters*, vol. 95, No. 091106, Sep. 4, 2009, 3 pgs.

Komanduri et al., "Multi-twist retarders for broadband polarization transformation", *Proc. of SPIE*, vol. 8279, No. 82790E, 2012, 10 pgs.

Komanduri et al., "Multi-twist retarders: broadband retardation control using self-aligning reactive liquid crystal layers", *Optics Express*, vol. 21, No. 1, Jan. 14, 2013, 17 pgs.

Komanduri et al., "Polarization-independent modulation for projection displays using small-period LC polarization gratings", *Journal of SID*, vol. 15, No. 8, 2007, 6 pgs.

Komanduri et al., "Reflective liquid crystal polarization gratings with high efficiency and small pitch", Proc. of SPIE, vol. 7050, No. 70500J-1, 2008, 10 pgs.

Kudenov et al., "Polarization spatial heterodyne interferometer: model and calibration", *Optical Engineering*, vol. 53. No. 4, Apr. 8, 2014, 9 pgs.

Kudenov et al., "Snapshot imaging Mueller matrix polarimeter using polarization gratings", *Optics Letter*, vol. 37, No. 8, Apr. 15, 2012, 3 pgs.

Kudenov et al., "Spatial heterodyne interferometry with polarization gratings", *Optic Letters*, vol. 37, No. 21, Nov. 1, 2012, 3 pgs.

Kudenov et al., "White-light channeled imaging polarimeter using broadband polarization gratings", *Applied Optics*, vol. 5, No. 15, May 20, 2011, 11 pages.

Li et al., "Broadband orbital angular momentum manipulation using liquid crystal thin-films", *Proc. of SPIE*, vol. 8274, No. 827415-1, 2012, 8 pgs.

Li et al., "Controlling orbital angular momentum using forked polarization gratings", *Proc. of SPIE*, vol. 7789, No. 77890E-1, 2010, 12 pgs.

Li et al., "Orbital angular momentum generation and mode transformation with high efficiency using forked polarization gratings", *Applied Optics*, vol. 51, No. 34, Dec. 1, 2012, 10 pgs.

Lockhart et al., "Novel infrared polarmeter for the ESO CRIRES+ instrument", *Proc. of SPIE*, vol. 9147, No. 91478P-1, 2014, 7 pgs.

Maione et al., "Narrowband emission line imaging spectrometry using Savart plates", *Proc. of SPIE*, vol. 9853, No. 985309-1, 2016, 11 pgs.

McManamon et al., "A Review of Phased Array Steering for Narrow-Band Electrooptical Systems", Proceedings of the IEEE, vol. 97, No. 6, Jun. 2009, 19 pgs.

Millar et al., "Polarization Gratings from Visible and Near-Infrared Astronomy", *Proc. of SPIE*, vol. 9151, No. 915141-1, 2014, 8 pgs.

Miskiewicz et al., "Optimization of direct-write polarization gratings", *Optical Engineering*, vol. 54, No. 3, Feb. 3, 2015, 10 pgs.

Miskiewicz et al., "An 2D FDTD Algorithm for Whole-Hemisphere Incidence on Periodic Media", IEEE Transactions on Antennas and Propagation, vol. 62, No. 3, Mar. 2014, 6 pgs.

Miskiewicz et al., "Direct-writing of complex liquid crystal patterns", *Optics Express*, vol. 22, No. 10, May 16, 2014, 16 pgs.

Miskiewicz et al., "Progress on large-area polarization grating fabrication", *Proc. of SPIE*, vol. 8395, No. 83950G-1, 2012, 7 pgs.

Nicolescu et al., "Compact spectrophotometer using polarization-independent liquid crystal tunable optical filters", *Proc. of SPIE*, vol. 6661, No. 666105-1, 2007, 9 pgs.

Nicolescu et al., "Polarization-independent tunable optical filters based on bilayer polarization gratings", *Applied Optics*, vol. 49, No. 20, Jul. 10, 2010, 5 pgs.

Nicolescu et al., "Polarization-independent tunable optical filters based on bilayer polarization gratings", *Proc. of SPIE*, vol. 7050, No. 705018-1, 2008, 12 pgs.

Nicolescu et al., "Polarization-independent tunable optical filters based on liquid crystal polarization gratings", *Proc. of SPIE*, vol. 6654, No. 665405-1, 2007, 11 pgs.

Nicolescu et al., "Polarization-Insensitive Variable Optical Attenuator and Wavelength Blocker Using Liquid Crystal Polarization Gratings", *Journal of Lightwave Technology*, vol. 28, No. 21, Nov. 1, 2010, 7 pgs.

Oh et al., "16.2: Polarization-Independent Modulation Using Standard Liquid Crystal Micodisplays and Polymer Polarization Gratings", *SID IDRC 08*, 2008, 4 pgs.

(56) References Cited

OTHER PUBLICATIONS

Oh et al., "Achromatic diffraction from polarization gratings with high efficiency", *Optic Letters*, vol. 33, No. 20, Oct. 15, 2008, 4 pgs.

Oh et al., "Achromatic polarization gratings as highly efficient thin-film polarizing beamsplitter for broadband light", *Proc. of SPIE*, vol. 6682, No. 668211-1, 2007, 12 pgs.

Oh et al., "Electrically switchable achromatic liquid crystal polarization grating on reflective substances", *Proc. of SPIE*, vol. 7050, No. 705019-1, 2008, 9 pgs.

Oh et al., "FDTD Analysis of 100%-Efficient Polarization-Independent Liquid Crystal Polarization Gratings", *Proc. of SPIE*, vol. 6332, No. 633212, 2016, 11 pgs.

Oh et al., "FDTD and Elastic Continuum Analysis of the Liquid Crystal Polarization Grating", *SID 06 Digest*, P-167, 2006, 4 pgs.

Oh et al., "High-throughoutput continuous beam steering using rotating polarization gratings", IEEE Photonics Technology Letters, vol. 22, No. 4, Feb. 15, 2010, 3 pgs.

Oh et al., "L-6: Late-News Paper: Achromatic Diffraction Using Reactive Mesogen Polarization Gratings", *SID 07 Digest*, 2007, 4 pgs.

Oh et al., "Numerical analysis of polarization gratings using the finite-difference time-domain method", *Physical Review A*, vol. 76, No. 043815, Oct. 12, 2007, 8 pgs.

Oh et al., "Time-domain analysis of periodic antisotropic media at oblique incidence: an efficient FDTD implementation", *Optics Express*, vol. 14, No. 24, Nov. 27, 2006, 15 pgs.

Often et al., "Vector Apodizing Phase Plate coronagraph: prototyping, characterization and outlook", *Proc. of SPIE*, vol. 9151, No. 91511R-2, 2014, 10 pgs.

Packham et al., "Polarization Gratings: Novel Polarimetric Component for Astronomical Instruments", *Publications of the Astronomical Society of the Pacific*, vol. 122, Nov. 18, 2010, 12 pgs.

Sanchez et al., "Printing of Monolithic Polymeric Microstructures Using Reactive Mesogens", *Wiley Interscience*, Advanced Material 2008, Dec. 7, 2007, 5 pgs.

Seo et al., "39.2: Polarization Conversion System Using a Polymer Polarization Grating", *SID 11 Digest*, 2011, 4 pgs.

Snik et al., "An Overview of Polarimetric Sensing Techniques and Technology with Applications to Different Research Fields", *Proc. of SPIE*, vol. 9099, No. 90990B-1, 2014, 20 pgs.

Snik et al., "Combining vector-phase coronagraphy with dual-beam polarimetry", *Proc. of SPIE*, vol. 9147, No. 91477U-1, 2014, 12 pgs.

Snik et al., "The Vector-App: A Broadband Apodizing Phase Plate that yields Complementary PSFs", *Proc. of SPIE*, vol. 8450, No. 8450M-1, 2012, 11 pgs.

Wang et al., "Snapshot retinal imaging Mueller matric polarimeter", *Proc. of SPIE*, vol. 9613, No. 96130A-1, 2007, 11 pgs.

Xiang et al., "Distortion-free broadband holograms: A novel class of elements utilizing the wavelength-independent geometric phase", Proceeding of the IEEE, vol. 9396, No. 938609-2, 2015, 6 pgs.

Xiang et al., "Numerical Modeling of Polarization Grating by Rigorous Coupled Wave Analysis", *Proc. of SPIE*, vol. 9769, No. 976918, 2016, 7 pgs.

\* cited by examiner

POLARIZATION CONVERSION USING GEOMETRIC PHASE AND POLARIZATION VOLUME HOLOGRAM OPTICAL ELEMENTS

TECHNICAL FIELD

This relates generally to optical elements, and in particular to anisotropic optical elements.

BACKGROUND

Polarization conversion devices have gained increasing interest for application on optics. In particular, polarization conversion devices for circularly polarized light have gained interest in field of display technologies.

Conventionally, conversion of light with both left-handed and right-handed circular polarization states to light with only one circular polarization state includes filtering the light with a circular polarizer, which transmits light with one polarization state while blocking the opposite polarization state. Such polarization conversion devices are highly inefficient and undesirable for many applications, including displays.

Therefore, there is a need for polarization conversion devices with minimal loss of energy.

SUMMARY

Accordingly, there is a need for methods and devices for converting unpolarized light into polarized light with no significant loss of energy.

The above deficiencies and other problems associated with conventional polarization conversion devices are reduced or eliminated by the methods and devices described herein.

In accordance with some embodiments, a device includes a first optical element configured to receive light in a first direction. The light includes a first component having a first circular polarization and a second component having a second circular polarization distinct from the first polarization. The first optical element is also configured to change polarization of the first portion of light from the first circular polarization to the second circular polarization and steer the first component from the first direction to a second direction distinct from the first direction. The first optical element is further configured to change polarization of the second component from the second circular polarization to the first circular polarization and steer the second component from the first direction to a third direction distinct from the first direction and the second direction. The device also includes a second optical element optically coupled with the first optical element. The second optical element is configured to receive the first component having the second circular polarization in the second direction and transmit the first component having the second polarization while maintaining the second polarization of the first component. The second optical element is also configured to receive the second component having the first circular polarization in the third direction, and change polarization of the second component from the first circular polarization to the second circular polarization.

In accordance with some embodiments, a method includes receiving, with a first optical element, light in a first direction. The light includes a first component having a first circular polarization and a second component having a second circular polarization distinct from the first polarization. The method also includes changing, with the first optical elements, polarization of the first component from the first circular polarization to the second circular polarization and steering the first component from the first direction to a second direction distinct from the first direction. The method further includes changing, with the first optical element, polarization of the second component from the second circular polarization to the first circular polarization and steering the second component from the first direction to a third direction distinct from the first direction and the second direction. Additionally, the method includes receiving, with a second optical element optically coupled with the first optical element, the first component having the second circular polarization in the second direction and transmitting the first component having the second polarization while maintaining the second polarization of the first component. The method also includes receiving, with the second optical element, the second component having the first circular polarization in the third direction and changing polarization of the second component from the first circular polarization to the second circular polarization.

Thus, the disclosed embodiments provide for a device and method for improved polarization conversion.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

These figures are not drawn to scale unless indicated otherwise.

DETAILED DESCRIPTION

The present disclosure describes methods and devices for converting unpolarized light into polarized light without significant loss of energy. The method includes converting unpolarized light into circularly polarized light using a combination of optical components including a geometric phase optical element (also called a Pancharatnam-Berry phase element, PBP) and a polarization volume hologram (PVH) element).

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first element could be termed a second element, and, similarly, a second element could be termed a first element, without departing from the scope of the various described embodiments. The first element and the second element are both element s, but they are not the same element.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Figure 1A:
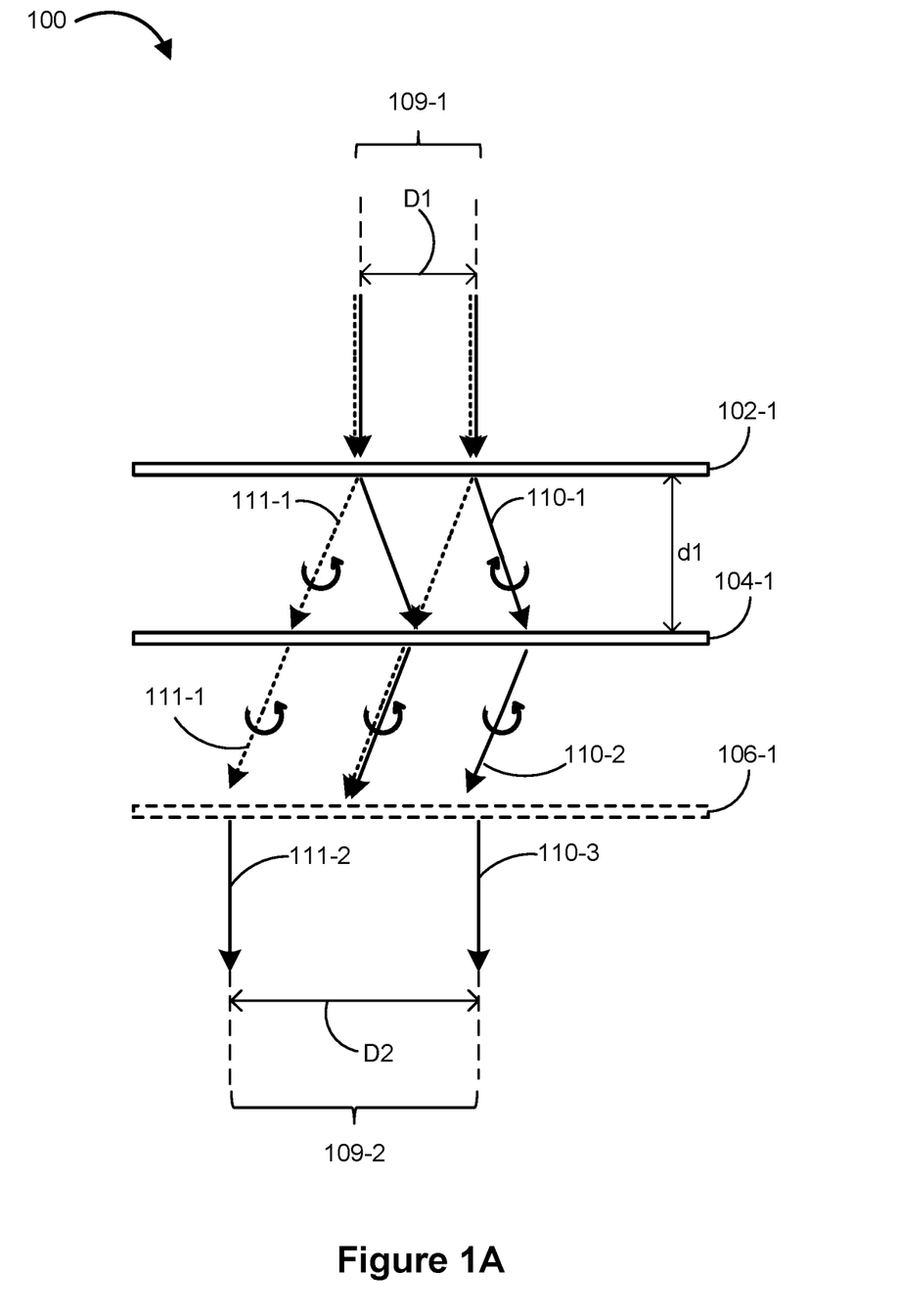
FIG. 1A is a schematic diagram illustrating a polarization conversion device in accordance with some embodiments.

FIG. 1A is a schematic diagram illustrating polarization conversion device 100 in accordance with some embodiments. Polarization conversion device 100 includes optical element 102-1 and optical element 104-1 optically coupled with optical element 102-1. In some embodiments, optical element 102-1 is a geometric phase optical element (also called a Pancharatnam-Berry phase (PBP) optical element), such as the geometric phase optical element described below with respect to FIGS. 2A-2D or the geometric phase optical element described below with respect to FIGS. 3A-3D. Optical element 102-1 is configured to receive unpolarized light 109-1 having beam size D1 in a first direction. Light 109-1 can be considered as comprising two oppositely polarized components with equal intensities, e.g., a right-handed circular polarization or RCP component and left-handed circular polarization or LCP component. Optical element 102-1 is configured to split light 109-1 into light 110-1 and light 111-1. Light 110-1 has a first polarization (e.g., RCP) and is transmitted by optical element 102-1 in a second direction different from the first direction, as shown in FIG. 1A. Light 111-1 has a second polarization (e.g., LCP) opposite to the first polarization and is transmitted by optical element 102-1 in a third direction different from the first direction or the second direction, as shown in FIG. 1A. In FIG. 1A, light having the first polarization (e.g., RCP) is illustrated using solid arrows, and light having the second polarization (e.g., LCP) is illustrated by dashed arrows. In some embodiments, optical element 102-1 functions to reverse the polarizations of both the RCP component of light 109-1 and the LCP component of light 109-1 and redirect these components into the second direction and the third direction, respectively, due to their opposite polarizations, as light 110-1 and 111-1, respectively. In some embodiments, the second direction of light 111-2 corresponds to +1st order diffraction of light 109-1 and the third direction of light 110-2 correspond to −1st order diffraction of the light 109-1.

In some embodiments, optical element 104-1 is a polarization volume holographic (PVH) element, such as the PVH optical element described below with respect to FIGS. 4A-4D or the geometric phase optical element described below with respect to FIGS. 5A-5D. Optical element 104-1 is configured to receive light 111-1 in the third direction and transmit light 111-1 without changing its direction or polarization. Concurrently, optical element 104-1 is configured to receive light 110-1 in the second direction and having the first polarization (e.g., right-handed circular polarization) and convert light 110-1 to light 110-2 having the third direction and the second polarization (e.g., left-handed circular polarization). After passing through optical element 104-1 light 110-2 has a direction and polarization corresponding to the direction and polarization of light 111-1. Polarization conversion device 100 including optical element 102-1 and 104-1 is thereby configured to convert unpolarized light 109-1 (e.g., light including a right-handed circular polarized component and a left-handed circular polarized component) into one or two beams of light both having the second polarization (e.g., left-handed circular polarization). Additionally, polarization conversion device 100 redirects light 109-1 from the first direction to the third direction (e.g., +1st order diffraction of light 109-1). As shown in FIG. 1A, optical element 104-1 can be positioned such that light 110-2 and light 111-1 form a single beam of light with an expanded beam size of D2 as compared to the beam size D1 of light 109.

In some embodiments, optical elements 102-1 and 104-1 are diffraction gratings (e.g., optical element 102-1 is a geometric phase diffraction grating such a geometric phase grating described below with respect to FIGS. 3A-3D and optical element 104-1 is a PVH diffraction grating such as a PVH grating described below with respect to FIGS. 5A-5D). In some embodiments, optical elements 102-1 and 104-1 are lenses (e.g., optical element 102-1 is a geometric phase lens such as a geometric phase lens described below with respect to FIGS. 2A-2D and optical element 104-1 is a PVH lens such as a PVH lens described above with respect to FIGS. 4A-4D). In some embodiments, optical elements 102-1 and 104-1 are axicons (e.g., liquid crystal axicons with flat surfaces, such as the ones described below with respect to FIGS. 2E-2H and FIGS. 4E-4H). In some embodiments, optical element 102-1 is a lens or an axicon and optical element 104-1 is a diffraction grating. In some embodiments, optical element 102-1 is a diffraction grating and optical element 104-1 is a lens or an axicon.

In some embodiments, polarization conversion device 100 further includes optical element 106-1 configured to output light 111-1 and light 110-2 as light 111-2 and light 110-3, respectively. Both light 111-2 and light 110-3 have the same polarization (e.g., the first polarization or the second polarization) and propagating in the third direction. In some embodiments, optical element 106-1 is configured to redirect light 111-1 and 110-2 such that light 111-2 and light 110-3 are output in the first direction by optical element 106-1. In some embodiments, the distance dl between optical element 102-1 and optical element 104-1 is selected such that light 111-2 and light 110-3 together form a single beam of light 109-2, which is collimated in the same direction as light 111-1. In some embodiments, light 111-2 and 110-3 are output in a different direction by optical element 106-1. In some embodiments, optical element 106-1 is an optical lens, an axicon, or a diffraction grating. In some embodiments, optical element 106-1 is a geometric phase optical element or a PVH optical element, or another kind of diffraction grating.

In FIG. 1A, polarization conversion device 100 is configured to receive a first light beam having first divergence and to covert the first light beam to a second light beam also having the first divergence. In other words, polarization conversion device 100 does not change divergence of light (e.g., light 109-1 incident on polarization conversion device 100 and light 109-2 output by polarization conversion device 100 are both collimated). As used herein, divergence of a light beam refers to an angular measure of the increase in a beam diameter with distance from a point or plane at which the light beam emerges. For a collimated beam the beam divergence is zero or small (e.g., a beam diameter remains constant or nearly constant over a particular distance).

As shown in FIG. 1A, polarization conversion device 100 converts light 109-1 including having components with different circular polarizations into light 109-2 including light 111-3 and 110-4 having the same circular polarization. There is no significant loss of energy from the conversion, as the optical elements are configured to convert both components in light 109-1 to form light 109-2. In contrast, in a conventional polarization conversion device (e.g., a polarization beam splitter), only light having a specific circular polarization is transmitted while light having the opposite circular polarization is reflected, absorbed, or otherwise blocked from being transmitted.

In some embodiments, polarization conversion device 100 is configured to defocus or diverge light 109-1. In some embodiments, polarization conversion device 100 including one or more axicons provides a point to line focusing of light 109-1. In some embodiments, such configuration including axicons provides an extended depth of field and a larger illumination area compared to polarization conversion devices including diffraction gratings and/or (non-axicon) lenses.

In some embodiments, polarization conversion device 100 expands light 109-1. In FIG. 1A, beam size D2 is greater than beam size D1. In some embodiments, light 109-1 is collimated and directed to a first direction and light 109-2 is collimated and directed to the first direction. In some embodiments, light 109-1 is collimated and directed to a first direction and light 109-2 is collimated and directed to a second direction different from the first direction. In some embodiments, polarization conversion device 100 diverges or converges light 109-1. In some embodiments, polarization conversion device 100 focuses or defocuses light 109-1.

Figure 1B:
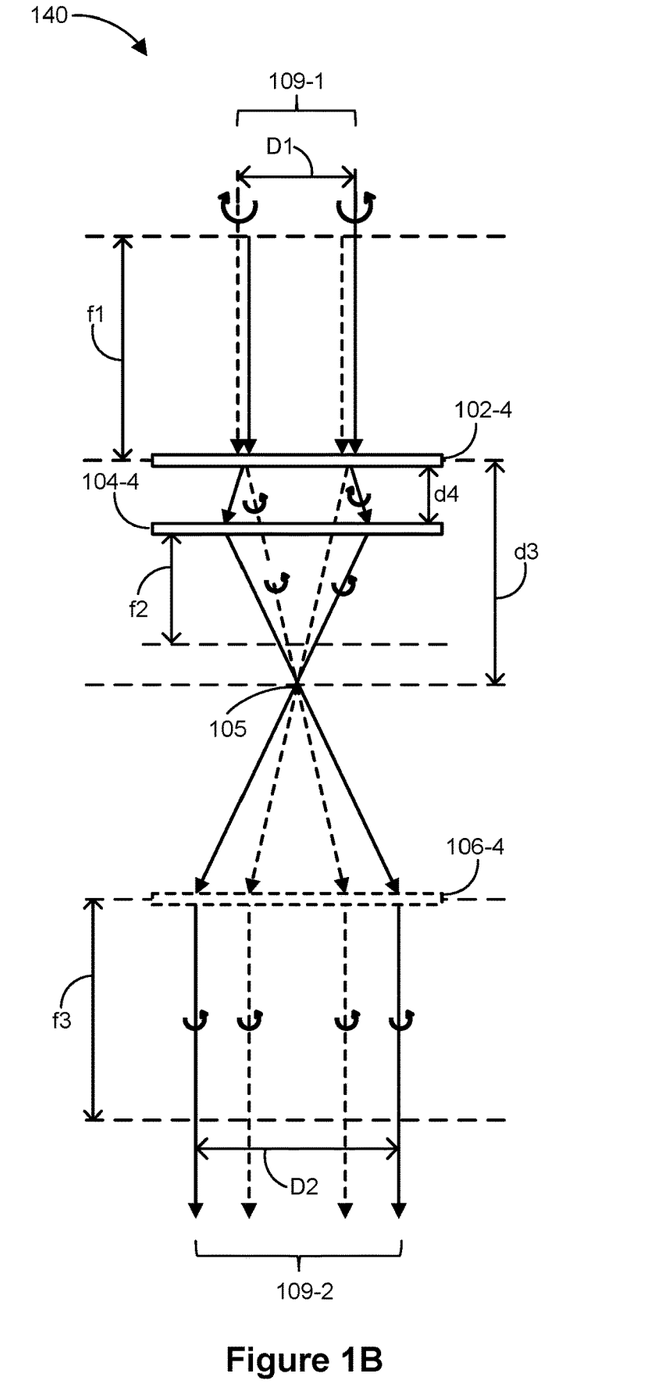
FIG. 1B is a schematic diagram illustrating a polarization conversion device in accordance with some embodiments.

FIG. 1B is a schematic diagram illustrating a polarization conversion device 140 in accordance with some embodiments. Polarization conversion device 140 comprises optical elements 102-4, 104-4, and 106-4, which correspond to optical elements 102-1, 104-1, and 106-1, respectively, in polarization conversion device 100 described above with respect to FIG. 1A. Optical element 102-4 (e.g., a geometric phase optical element), optical element 104-4 (e.g., a PVH optical element), and optical element 106-4 are lenses. The focal distances of the respective optical elements 102-4, 104-4, and 106-4 are configured so that polarization conversion device 140 acts as a beam expander to expand incident collimated light (e.g., 109-1 with beam size D1 in FIG. 1A) to output collimated light (e.g., light 109-2 with beam size D2 in FIG. 1A). In FIG. 1B, optical element 102-4 is a lens with focal distance f1, optical element 104-4 is a lens with focal distance f2, and optical element 106-4 is a lens with focal distance f3. In some embodiments, the focal distances of respective optical elements 102-4, 104-4, and 106-4 and the distances between optical elements 102-4, 104-4, and 106-4 are selected so that the output light (e.g., light 109-2 in FIG. 1A) is collimated. In FIG. 1B, focal distance f2 is about half of focal distance f1 (i.e., f2≈−f1/2) and focal distance f3 is about the same as focal distance f1 (i.e., f3≈−f1). As shown in FIG. 1B, light 109-1 includes two components, a first component having a first circular polarization (e.g., solid line) and a second component having a second circular polarization (e.g., dashed line). The second component (dashed line) is focused by optical element 102-4 having focal distance f1 to focal point 105 located at distance d3 from optical element 102-4 (i.e., d3≈f1). Optical element 104-4 has no effect on the optical path of the second component, as described above with respect to light 111-1 in FIG. 1A (i.e., optical element 104-4 does not change the direction or polarization of the second component). The first component (solid line) is defocused by optical element 102-4, and then focused by optical element 104-4 positioned at distance d4 from optical element 102-4. Distance d4 is selected such that the first component is focused, by optical element 104-4, to a common focal point 105 at distance d3 from optical element 102-4. Also, in FIG. 1B optical element 106-4 with focal distance f3≈−f1 is disposed collimates the first and the second components focused on focal point 105. With such a selection of focal distances and positioning of optical elements 102-4, 104-4, and 106-4, polarization conversion device 140 expands collimated light (e.g., light 109-1 in FIG. 1A) to collimated light (e.g., light 109-2 in FIG. 1A) with an increased beam size. The expansion ratio, i.e., the ratio of the size of the output light 109-2 to that of the incident light 109-1 is related to the focal distances and distance d4 between optical elements 102-4 and 104-4, as shown in FIG. 1B.

Figure 1C:
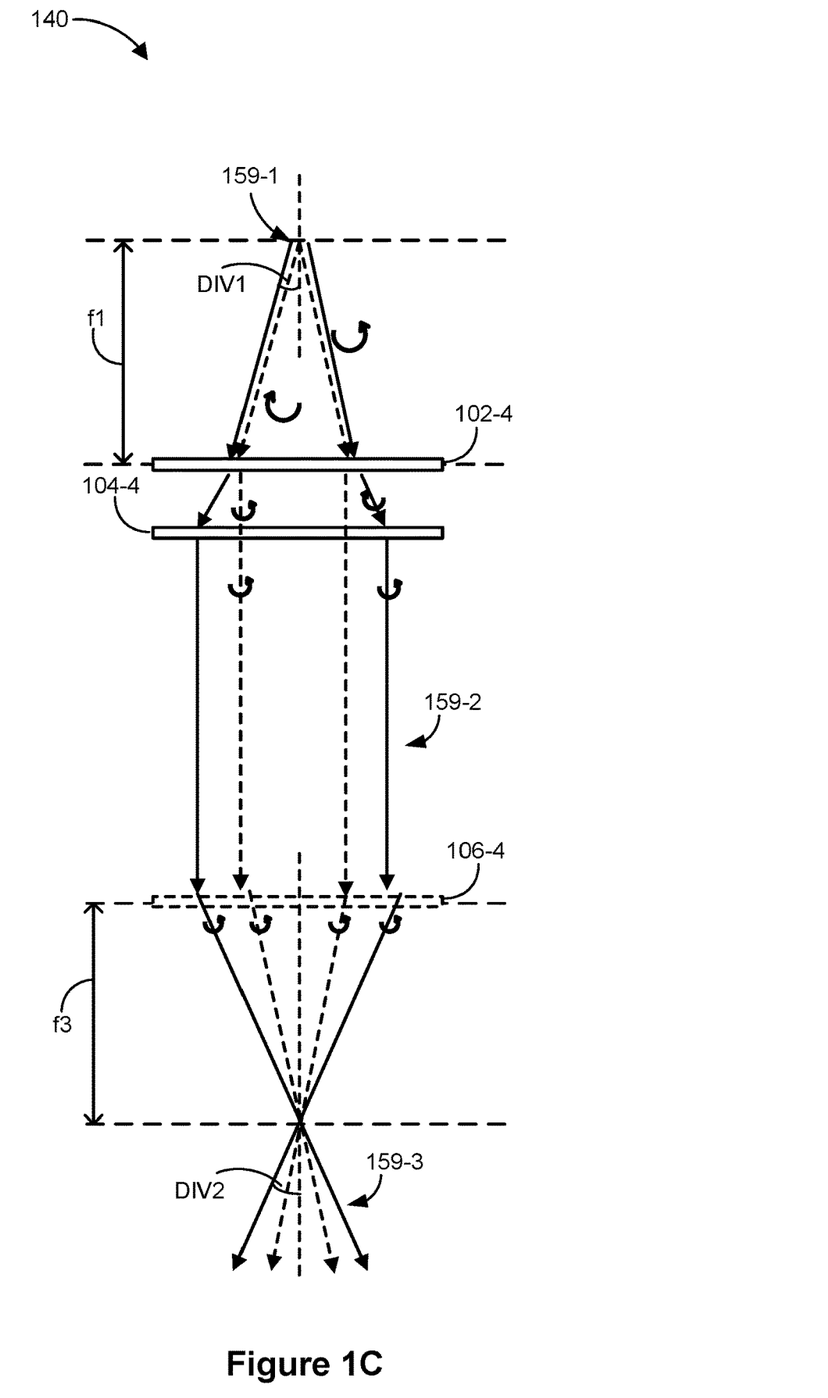
FIG. 1C is a schematic diagram providing further illustration of the polarization conversion device of FIG. 1B in accordance with some embodiments.

FIG. 1C is a schematic diagram providing further illustration of polarization conversion device 140 in accordance with some embodiments. In contrast to FIG. 1B showing polarization conversion device 140 acting on collimated light 109-1, in FIG. 1C, polarization conversion device 140 acts on a diverging light. In FIG. 1C, light 159-1 is projected from a point source located at focal distance f1 from optical component 102-4. Light 159-1 diverges at angle DIV1. Light 159-1 is transmitted through optical components 102-4 and 104-4 as collimated light 159-2 and received by optical component 106-4. Optical component 106-4 focuses light 159-2 at focal distance f3. Light 159-2 then diverges as light 159-3 at divergence angle DIV2. The difference between DIV1 and DIV2 depends can be adjusted by adjusting the focal length of optical component 106-4. In some embodiments, angle DIV1 corresponds to angle DIV2.

FIGS. 2A-2D are schematic diagrams illustrating geometric phase lens 200 in accordance with some embodiments. In some embodiments, geometric phase lens 200 corresponds to geometric phase optical elements in polarization conversion devices 100 and 140 described above with respect to FIGS. 1A-1B (e.g., optical elements 102-1 and/or 102-4). In some embodiments, geometric phase lens 200 is a liquid crystal geometric phase element including a layer of liquid crystals. In some embodiments, geometric phase lens 200 includes a layer of other type of substructures, e.g., nanopillars composed of high refraction index materials. Geometric phase lens 200 adds or removes optical power based in part on polarization of incident light. For example, if right handed circularly polarized (RCP) light is incident on geometric phase lens 200, geometric phase lens 200 acts as a positive lens (i.e., it causes light to converge). And, if left handed circularly polarized (LCP) light is incident on the geometric phase lens, the geometric phase lens acts as a negative lens (i.e., it causes light to diverge). In some embodiments, the geometric phase lens also reverses the handedness of the incident light (e.g., changing LCP to RCP or vice versa). The geometric phase lens is also wavelength selective. If the incident light is at the designed wavelength, LCP light is converted to RCP light, and vice versa, while light with wavelength outside the designed wavelength range is transmitted without its polarization converted. The geometric phase lens may have a large aperture size and can be made with a very thin liquid crystal layer. Optical properties of the geometric phase lens (e.g., focusing power or diffracting power) are based on variation of azimuthal angles (θ) of liquid crystal molecules. For example, for a geometric phase lens, azimuthal angle θ of a liquid crystal molecule is determined based on Equation (1):

$$\theta = \left(\frac{r^2}{f} * \frac{\pi}{\lambda}\right) / 2 \quad (1)$$

where r denotes a radial distance between the liquid crystal molecule and an optical center of the geometric phase lens, f denotes a focal distance, and λ denotes a wavelength of the light that the geometric phase is designed for. Thus, in some embodiments, the azimuthal angles of the liquid crystal molecules in the x-y plane increase from the optical center to an edge of the geometric phase lens. In some embodiments, as expressed by Equation (1), a rate of increase in azimuthal angles between neighboring liquid crystal molecules also increases with the distance from the optical center of the geometric phase lens. The geometric phase lens creates a respective lens profile based on the orientations (i.e., azimuth angle θ) of a liquid crystal molecule in the x-y plane. In contrast, a (non-geometric phase) liquid crystal lens creates a lens profile via a birefringence property and a thickness of a liquid crystal layer.

Figure 2A:
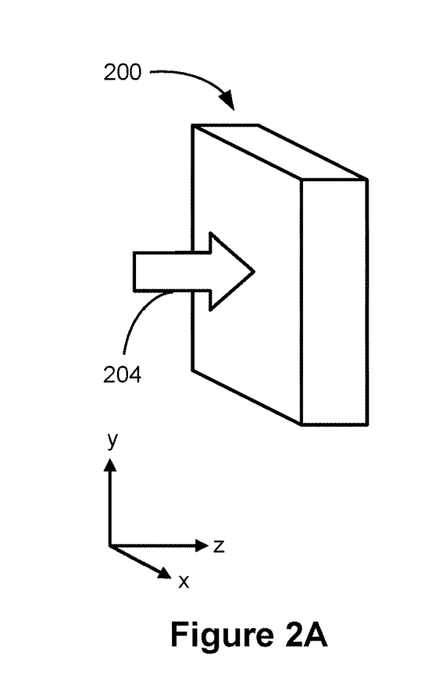
FIGS. 2A-2D are schematic diagrams illustrating a geometric phase lens in accordance with some embodiments.
Figure 2B:
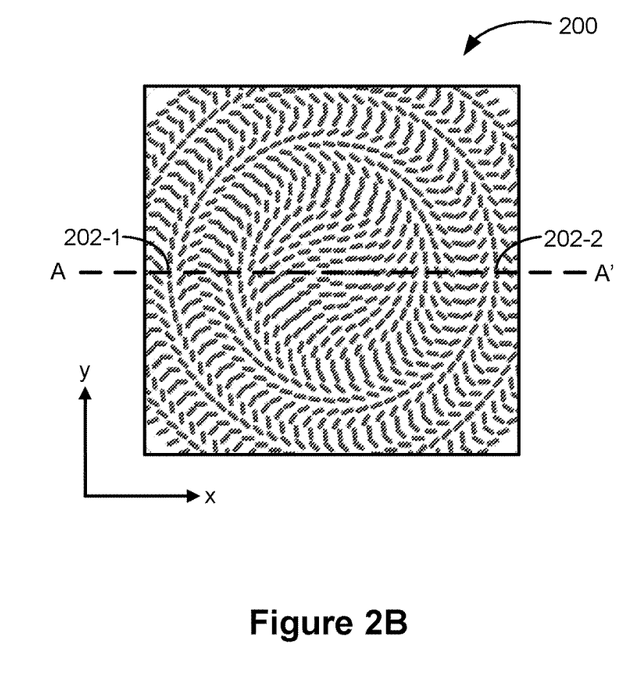
Figure 2C:
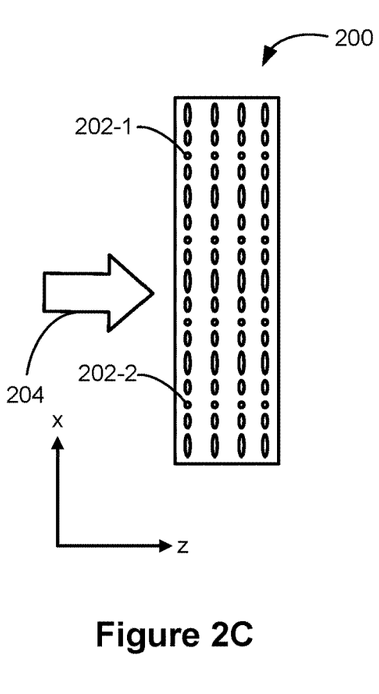
Figure 2D:
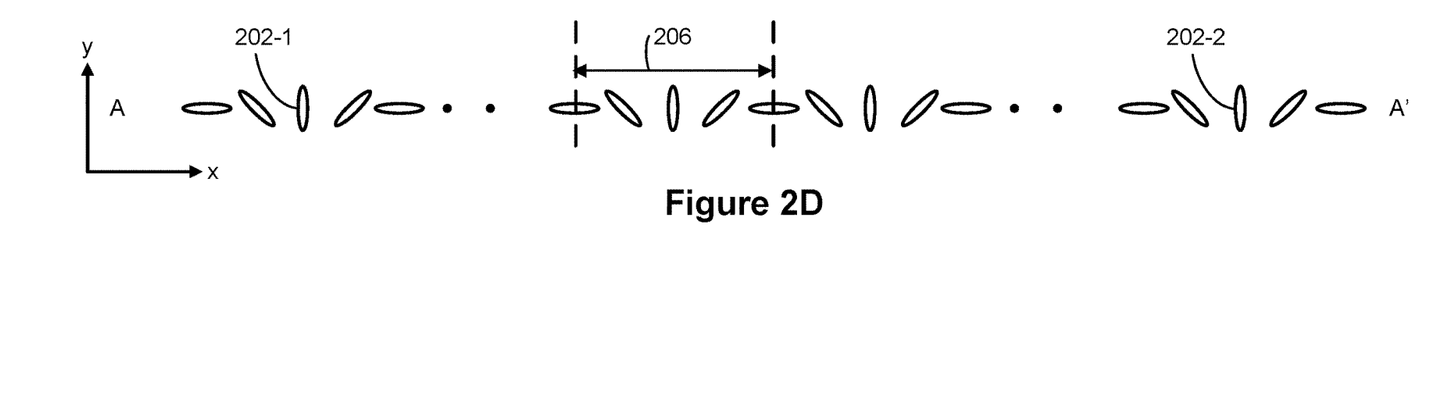

FIG. 2A illustrates a three dimensional view of geometric phase lens 200 with incoming light 204 entering the lens along the z-axis. FIG. 2B illustrates an x-y-plane view of geometric phase lens 200 with a plurality of liquid crystals (e.g., liquid crystals 202-1 and 202-2) with various orientations. The orientations (i.e., azimuthal angles θ) of the liquid crystals vary along reference line between A and A' from the center of geometric phase lens 200 toward the periphery of geometric phase lens 200. FIG. 2C illustrates an x-z-cross-sectional view of geometric phase lens 200. As shown in FIG. 2C, the orientations of the liquid crystal (e.g., liquid crystals 202-1 and 202-2) remain constant along z-direction. FIG. 2D illustrates a detailed plane view of the liquid crystals along the reference line between A and A' shown in FIG. 2B. Pitch 206 is defined as a distance along the x-axis at which the azimuth angle of a liquid crystal has rotated 180 degrees. In some embodiments, pitch 206 varies as a function of distance from the center of geometric phase lens 200. In a case of a lens, the azimuthal angle of liquid crystals varies in accordance with Equation (1) shown above. In such cases, the pitch at the center of the lens is longest and the pitch at the edge of the lens is shortest.

Figure 2E:
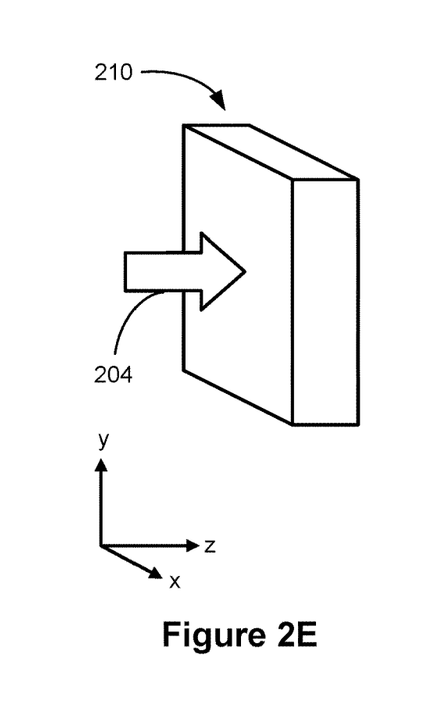
FIGS. 2E-2H are schematic diagrams illustrating a geometric phase axicon in accordance with some embodiments.
Figure 2F:
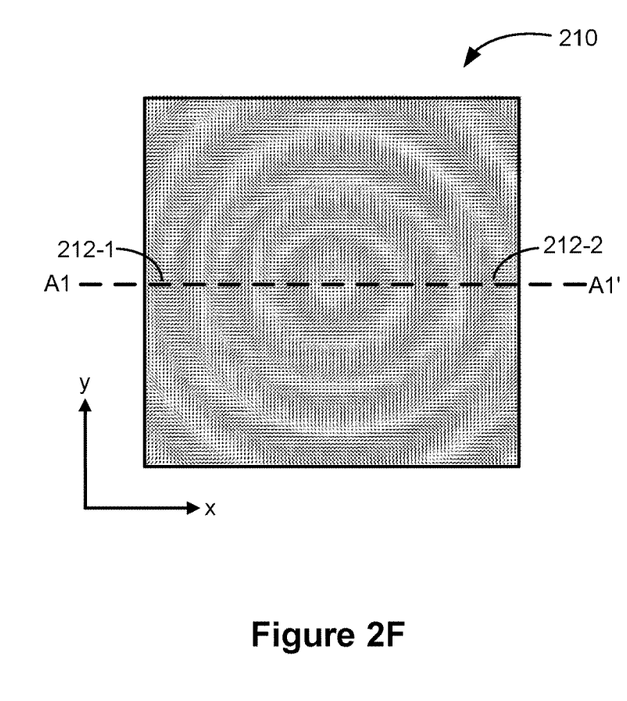
Figure 2G:
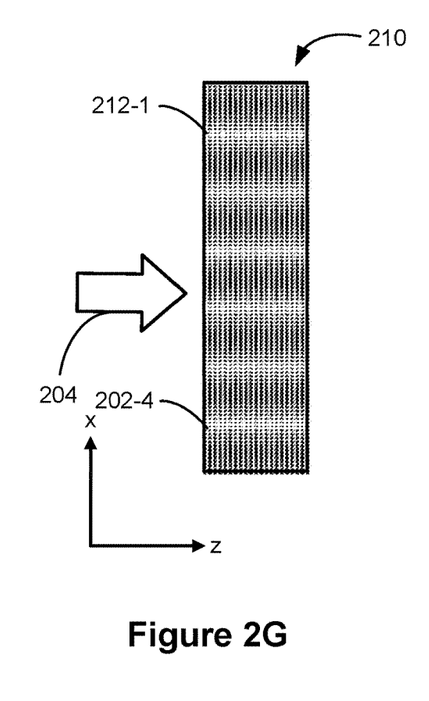
Figure 2H:
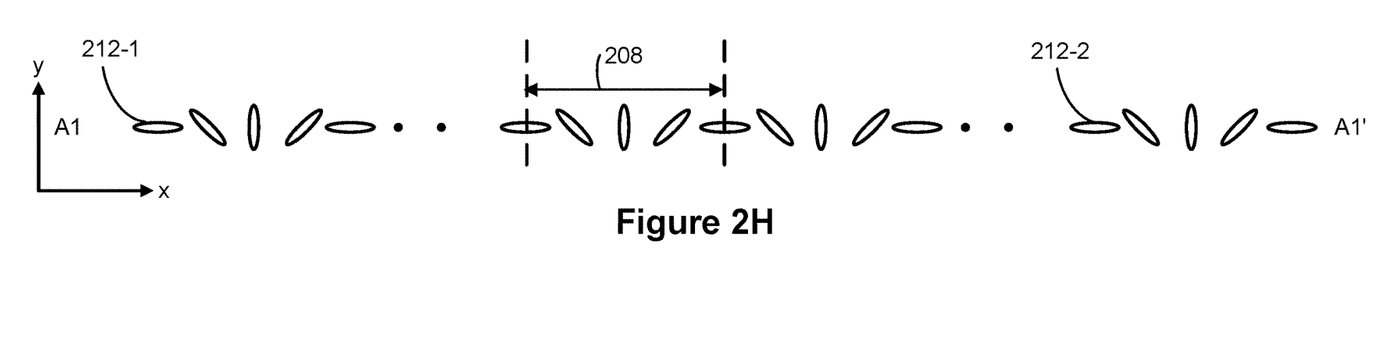

FIGS. 2E-2H are schematic diagrams illustrating geometric phase axicon 210 in accordance with some embodiments. In some embodiments, geometric phase axicon 210 corresponds to geometric phase optical elements in polarization conversion devices 100 and 140 described above with respect to FIGS. 1A-1B (e.g., optical elements 102-1 and/or 102-4). Geometric phase axicon 210 corresponds to geometric phase lens 200 described above with respect to FIGS. 2A-2D, except that geometric phase axicon 210 is configured to focus or defocus light acting as an axicon lens. FIG. 2E illustrates a three dimensional view of geometric phase axicon 210 with incoming light 204 entering the lens along the z-axis. FIG. 2F illustrates an x-y-plane view of geometric phase axicon 210 with a plurality of liquid crystals (e.g., liquid crystals 212-1 and 212-2) with various orientations. The orientations (i.e., azimuthal angles θ) of the liquid crystals vary along reference line between A1 and A1' from the center of geometric phase axicon 210 toward the periphery of geometric phase axicon 210. FIG. 2G illustrates an x-z-cross-sectional view of geometric phase axicon 210. As shown in FIG. 2G, the orientations of the liquid crystal (e.g., liquid crystals 212-1) remain constant along z-direction. FIG. 2H illustrates a detailed plane view of the liquid crystals along the reference line between A1 and A1' shown in FIG. 2F. Pitch 208 is defined as a distance along the x-axis at which the azimuth angle of a liquid crystal has rotated 180 degrees. In case of a flat axicon lens, pitch 208 remains constant along reference line between A1 and A1' from the center of geometric phase axicon 210 toward the periphery of geometric phase axicon 210.

Figure 3A:
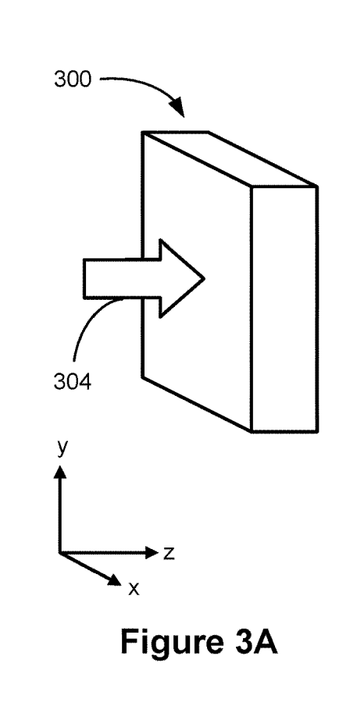
FIGS. 3A-3D are schematic diagrams illustrating a geometric phase grating in accordance with some embodiments.
Figure 3B:
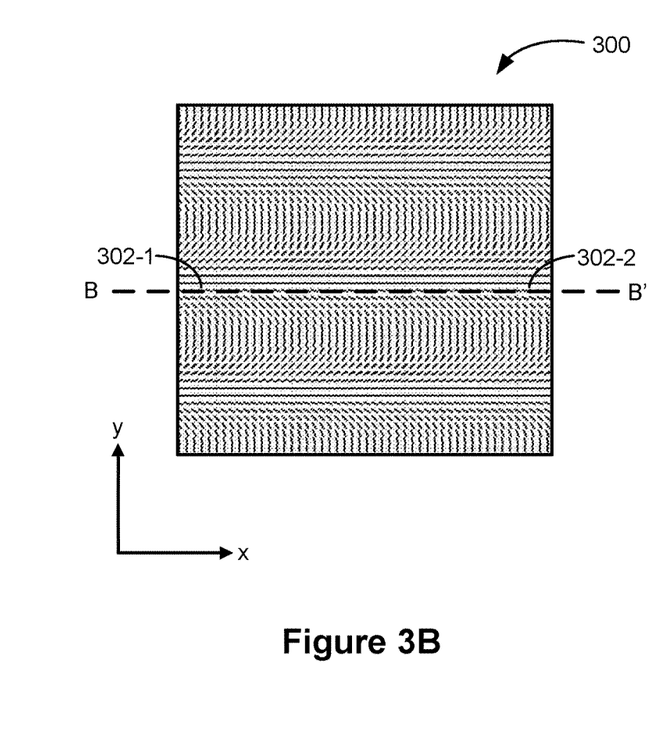
Figure 3C:
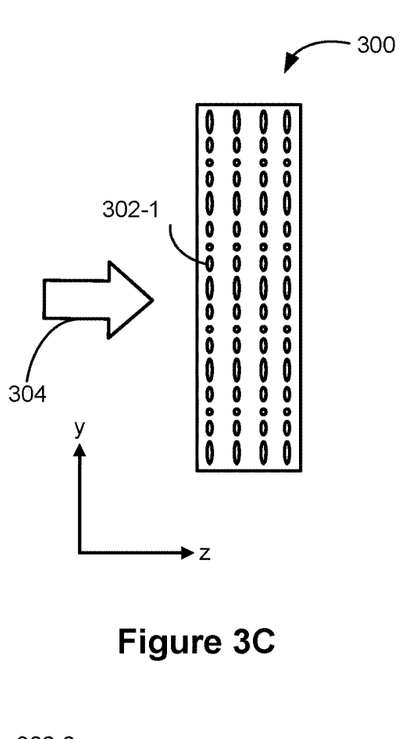
Figure 3D:
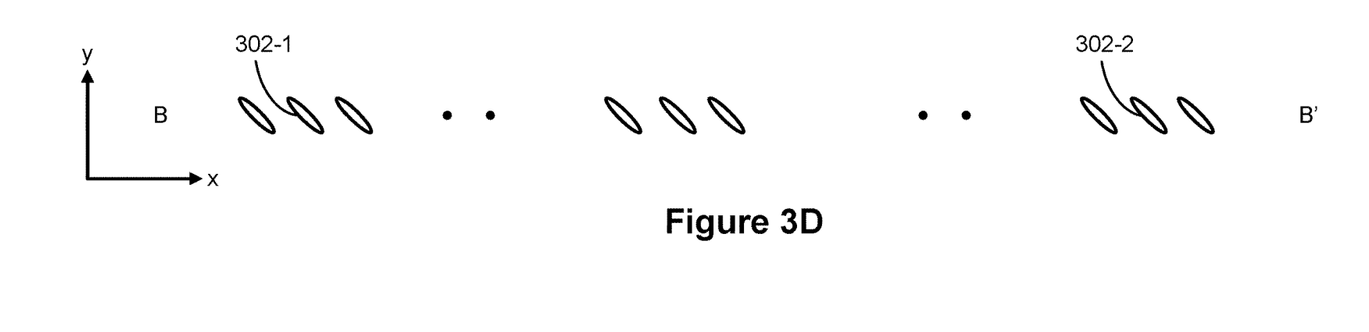

FIGS. 3A-3D are schematic diagrams illustrating geometric phase grating 300 in accordance with some embodiments. FIG. 3A illustrates a three dimensional view of geometric phase grating 300 with incoming light 304 entering the lens along the z-axis. FIG. 3B illustrates an x-y-plane view of geometric phase grating 300 showing a plurality of liquid crystals (e.g., liquid crystals 302-1 and 302-2) with various orientations in the geometric phase grating 300. In contrast to geometric phase lens 200 described above with respect to FIG. 2B, the orientations (i.e., azimuthal angles θ) of the liquid crystals are constant along reference line between B and B' along the x-axis, as shown in FIG. 3D illustrating a detailed plane view of the liquid crystals along the reference line. The orientations of the liquid crystals in FIG. 3B vary along the y-axis corresponding to the plane view of liquid crystals shown in FIG. 2D with respect to geometric phase lens 200. However, in a case of a grating, the pitch defined as a distance along the y-axis at which the azimuth angle of a liquid crystal has rotated 180 degrees is constant throughout the grating. FIG. 3C illustrates an y-z-cross-sectional view of geometric phase grating 300. As shown in FIG. 3C, the orientations of the liquid crystal (e.g., liquid crystal 302-1) remain constant along z-direction, similarly to lens 200 illustrated in FIG. 2C.

FIGS. 4A-4D are schematic diagrams illustrating PVH lens 400 in accordance with some embodiments. In some embodiments, PVH lens 400 corresponds to PVH optical elements of polarization conversion devices 100 and 140 described above with respect to FIGS. 1A-1B, respectively (e.g., optical elements 104-1 and 104-4). PVH lens 200 is a liquid crystal PVH lens including a layer of liquid crystals arranged in helical structures (e.g., a liquid crystal formed of a cholesteric liquid crystal). Similar to a geometric phase lens, a PVH lens adds or removes optical power based in part on polarization of an incident light. However, PVH lens is selective with respect to circular polarization of light. When state (handedness) of the circularly polarized light is along a helical axis of a liquid crystal, the PVH lens interacts with the circularly polarized light and thereby changes the direction of the light (e.g., refracts or diffracts the light). Concurrently, while transmitting the light, the PVH lens also changes the polarization of the light. In contrast, the PVH lens transmits light with opposite circular polarization without changing its direction or polarization. For example, a PVH lens changes polarization of RCP light to LCP light and simultaneously focuses or defocuses the light while transmitting LCP light without changing its polarization or direction. Optical properties of the PVH lens (e.g., focusing power of diffracting power) are based on variation of azimuthal angles of liquid crystal molecules, as described above with respect to FIGS. 2A-2D. In addition, the optical properties of the PVH are based on a helical axis and/or a helical pitch of a liquid crystal.

Figure 4A:
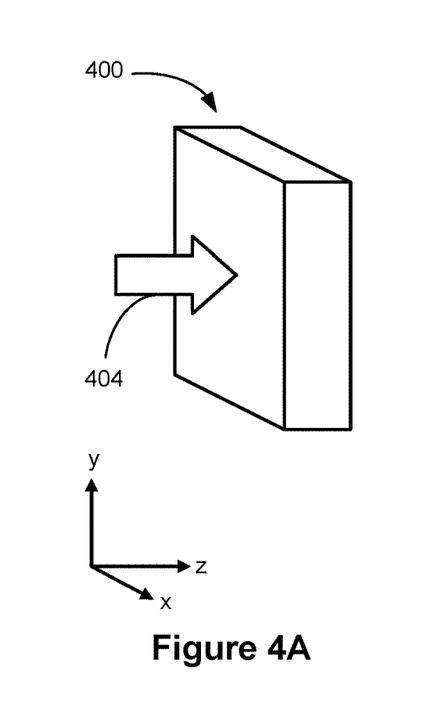
FIGS. 4A-4D are schematic diagrams illustrating a polarization volume holographic optical lens in accordance with some embodiments.
Figure 4B:
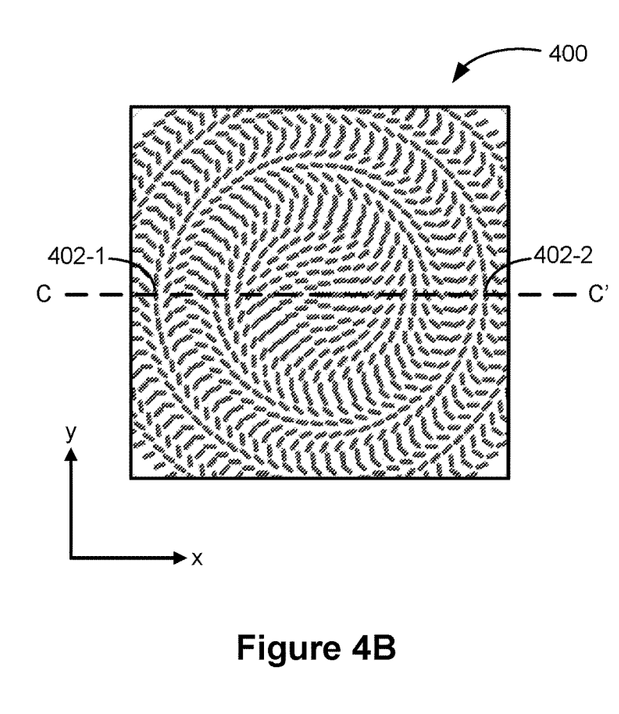
Figure 4C:
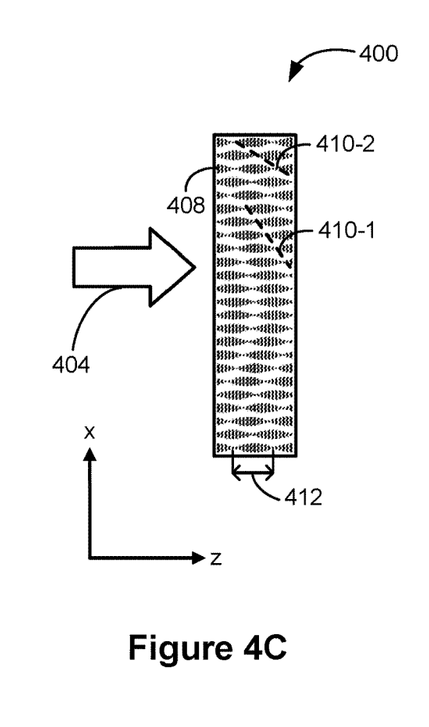
Figure 4D:
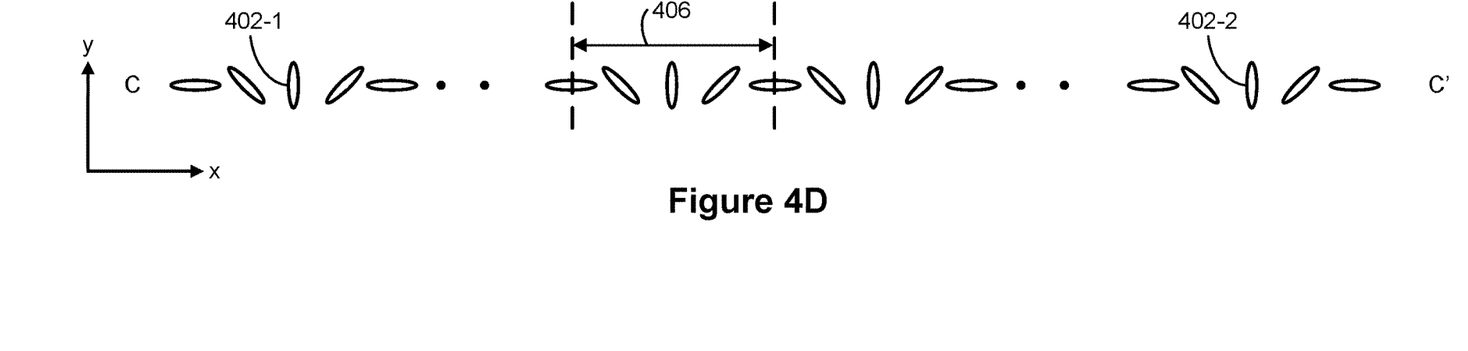

FIG. 4A illustrates a three dimensional view of PVH lens 400 with incoming light 404 entering the lens along the z-axis. FIG. 4B illustrates an x-y plane view of PVH lens 400 with a plurality of liquid crystals (e.g., liquid crystals 402-1 and 402-2) with various orientations. The orientations (i.e., azimuthal angle θ) of the liquid crystals vary along reference line between C and C' from the center of PVH lens 400 toward the periphery of PVH lens 400. FIG. 4C illustrates an x-z-cross-sectional view of PVH lens 400. As shown in FIG. 4C, in contrast to geometric phase lens described with respect to FIG. 2C, the liquid crystals (e.g., liquid crystals 402-1 and 402-2 in FIG. 4B) of PVH lens 400 are arranged in helical structures 408. Helical structures 408 have helical axes aligned corresponding to the z-axis. As the azimuthal angle of respective liquid crystals on the x-y-plane varies, the helical structures create a volume grating with a plurality of diffraction planes (e.g., planes 410-1 and 410-2) forming cycloidal patterns. The diffraction planes (e.g., Bragg diffraction planes) defined in a volume of an PVH lens produce a periodically changing refractive index. Helical structures 408 define the polarization selectivity of PVH lens 400, as light with circular polarization handedness corresponding to the helical axis is diffracted while light with circular polarization with the opposite handedness is not diffracted. Helical structures 408 also define the wavelength selectivity of PVH lens 400, as light with wavelength close to a helical pitch (e.g., helical pitch 412 in FIG. 4C) is diffracted while light with other wavelengths is not diffracted. A helical pitch refers to a distance when a helix has made a 180 degree turn along a helical axis (e.g., the z-axis in FIG. 4C). FIG. 4D illustrates a detailed plane view of the liquid crystals along the reference line between C and C' in FIG. 4B. Pitch 406 is defined as a distance along x-axis at which the azimuth angle of liquid crystal has rotated 180 degrees from the initial orientation. In some embodiments, pitch 406 varies as a function of distance from the center of PVH lens 400. In a case of a lens, the azimuthal angle of liquid crystals varies in accordance with Equation (1) shown above. In such cases, the pitch at the center of the lens is the longest and the pitch at the edge of the lens is the shortest.

Figure 4E:
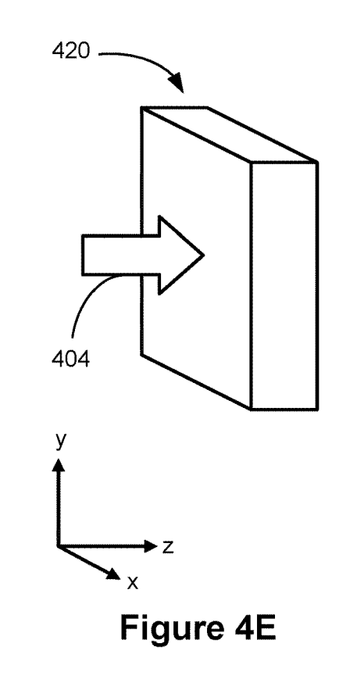
FIGS. 4E-4H are schematic diagrams illustrating a polarization volume holographic axicon in accordance with some embodiments.
Figure 4F:
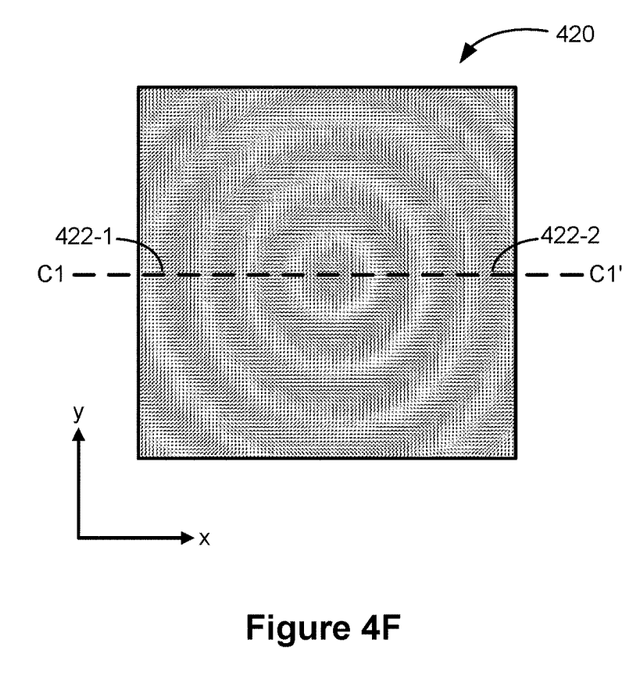
Figure 4G:
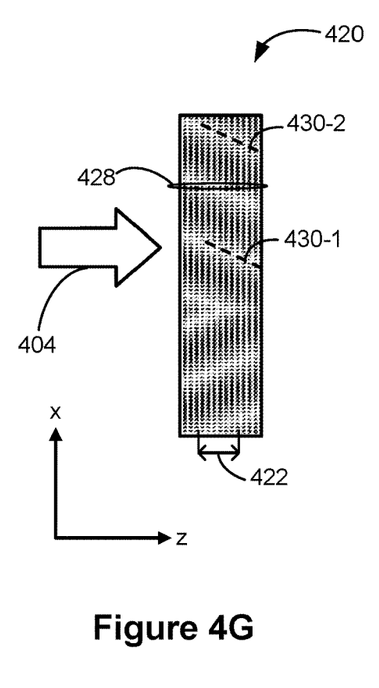
Figure 4H:
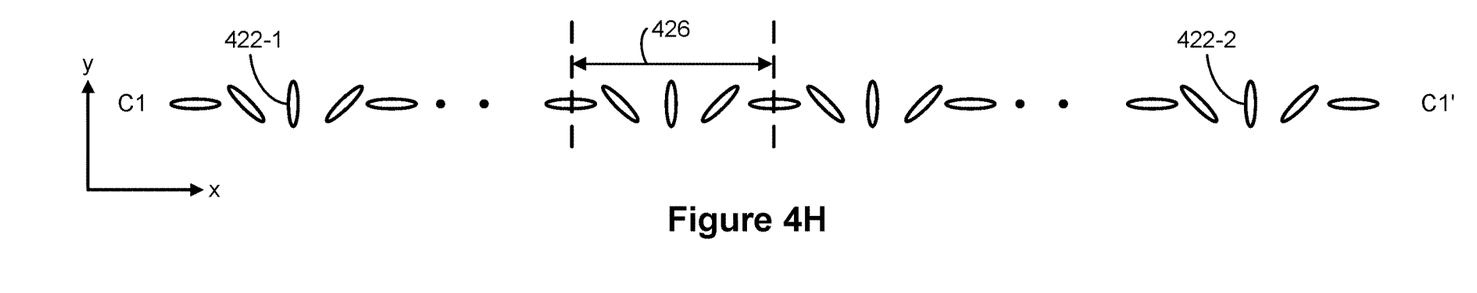

FIGS. 4E-4H are schematic diagrams illustrating polarization volume holographic axicon 420 in accordance with some embodiments. In some embodiments, PVH axicon 420 corresponds to PVH optical elements in polarization conversion devices 100 and 140 described above with respect to FIGS. 1A-1B (e.g., optical elements 102-1 and/or 102-4). PVH axicon 420 corresponds to PVH lens 400 described above with respect to FIGS. 4A-4D, except that PVH axicon 420 is configured to focus or defocus light acting as an axicon lens. FIG. 4E illustrates a three dimensional view of PVH axicon 420 with incoming light 404 entering the lens along the z-axis. FIG. 4F illustrates an x-y plane view of PVH axicon 420 with a plurality of liquid crystals (e.g., liquid crystals 422-1 and 422-2) with various orientations. The orientations (i.e., azimuthal angle θ) of the liquid crystals vary along reference line between C1 and C1' from the center of PVH axicon 420 toward the periphery of PVH axicon 420. FIG. 4G illustrates an x-z-cross-sectional view of PVH axicon 420. As shown in FIG. 4G, the liquid crystals (e.g., liquid crystals 402-1 and 402-2) of PVH axicon 420 are arranged in helical structures 428. Helical structures 428 have helical axes aligned corresponding to the z-axis. As the azimuthal angle of respective liquid crystals on the x-y-plane varies, the helical structures create a volume grating with a plurality of tilted diffraction planes (e.g., planes 430-1 and 430-2). The diffraction planes (e.g., Bragg diffraction planes) defined in a volume of an PVH axicon produce a periodically changing refractive index. Helical structures 428 define the polarization selectivity of PVH axicon 420, as light with circular polarization handedness corresponding to the helical axis is diffracted while light with circular polarization with the opposite handedness is not diffracted. Helical structures 428 also define the wavelength selectivity of PVH axicon 420, as light with wavelength approximate to a helical pitch (e.g., helical pitch 422 in FIG. 4G) is diffracted while light with other wavelengths is not diffracted. A helical pitch refers to a distance when a helix has made a 180 degree turn along a helical axis (e.g., the z-axis in FIG. 4G). FIG. 4H illustrates a detailed plane view of the liquid crystals along the reference line between C1 and C1' in FIG. 4F. Pitch 426 is defined as a distance along x-axis at which the azimuth angle of liquid crystal has rotated 180 degrees from the initial orientation. In case of a flat axicon lens, pitch 426 remains constant along reference line between C1 and C1' from the center of geometric phase axicon 420 toward the periphery of geometric phase axicon 420.

Figure 5A:
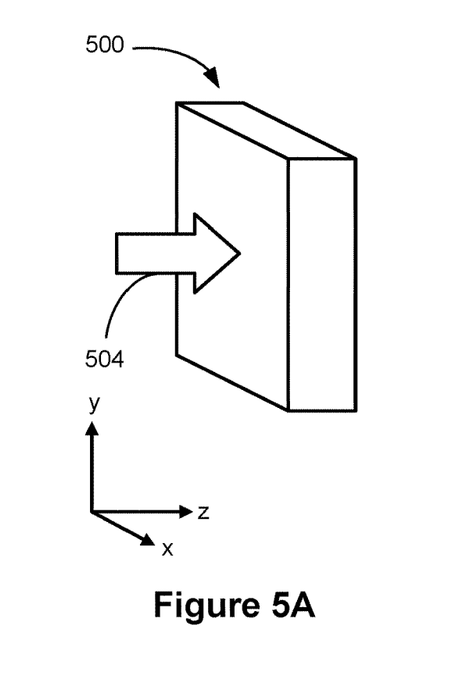
FIGS. 5A-5D are schematic diagrams illustrating a polarization volume holographic grating in accordance with some embodiments.
Figure 5B:
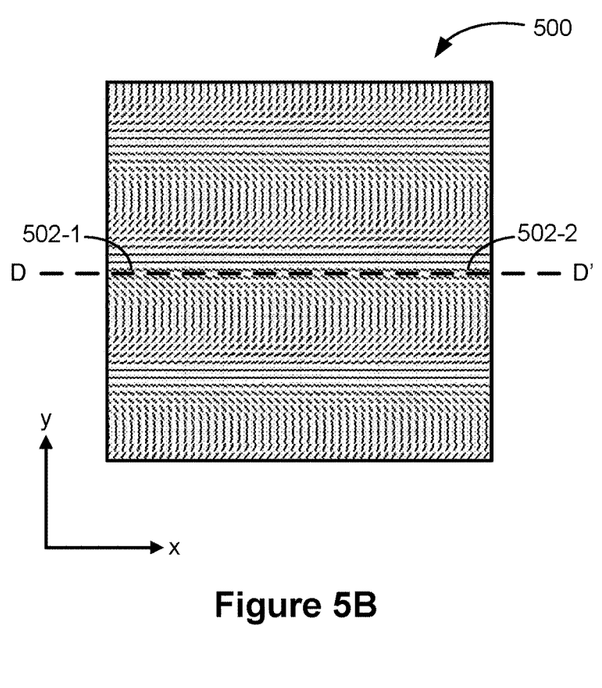
Figure 5C:
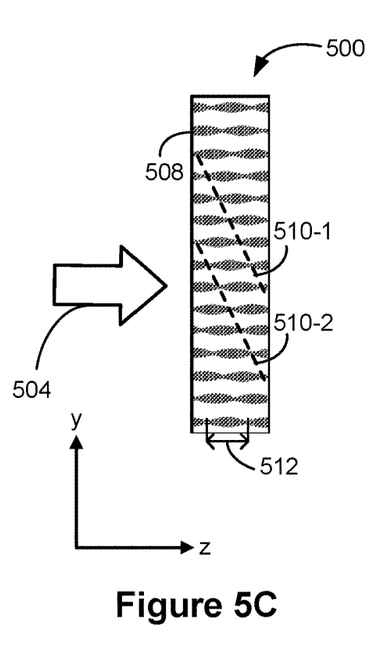
Figure 5D:
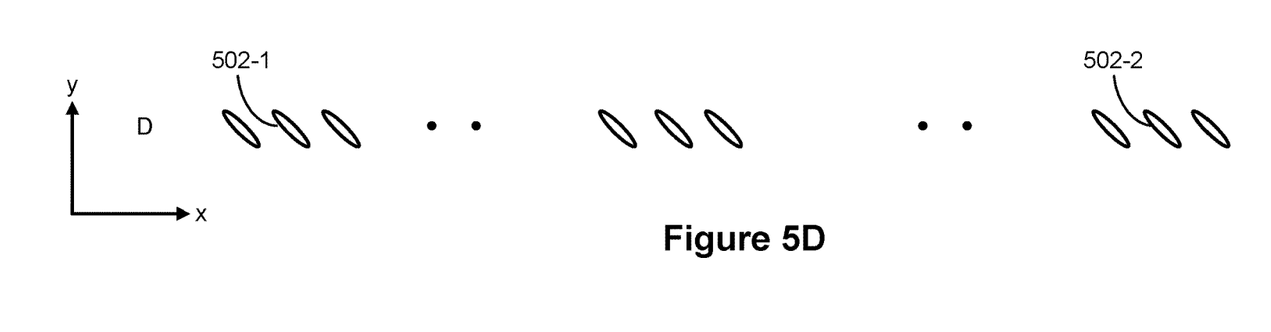

FIGS. 5A-5D are schematic diagrams illustrating PVH grating 500 in accordance with some embodiments. FIG. 5A illustrates a three dimensional view of PVH grating 500 with incoming light 504 entering the lens along the z-axis. FIG. 5B illustrates an x-y-plane view of PVH grating 500 with a plurality of liquid crystals (e.g., liquid crystals 502-1 and 502-2) with various orientations. In contrast to PVH lens 400 described above with respect to FIG. 4B, the orientations (i.e., azimuthal angles θ) of the liquid crystals are constant along reference line between D and D' along the x-axis, as shown in FIG. 5D illustrating a detailed plane view of the liquid crystals along the reference line. The orientations of the liquid crystals in FIG. 5B vary along the y-axis corresponding to the plane view of liquid crystals shown in FIG. 4D with respect to PVH lens 400. However, in a case of a grating, the pitch defined as a distance along the y-axis at which the azimuth angle of a liquid crystal has rotated 180 degrees is constant throughout the grating. FIG. 5C illustrates an y-z-cross-sectional view of PVH grating 500. In contrast to PVH lens 400 shown in FIG. 4C, PVH grating 500 has helical structures 508 with helical axes aligned corresponding to the x-axis. The helical structures create a volume grating with a plurality of diffraction planes (e.g., planes 510-1 and 510-2). In contrast to planes 410-1 and 410-2 shown in FIG. 4C for PVH lens 400, the diffraction planes of PVH grating 500 extend across the lens. In FIG. 5C, diffraction planes 510-1 and 510-2 are tilted with respect to the z-axis. As explained above with respect FIG. 4C, helical structures 508 define the polarization selectivity of PVH grating 500, as light with circular polarization handedness corresponding to the helical axes is diffracted while light with circular polarization with the opposite handedness is not diffracted. Helical structures 508 also define the wavelength selectivity of PVH grating 500, as light with wavelength close to a helical pitch (e.g., helical pitch 512 in FIG. 5C) is diffracted while light with other wavelengths is not diffracted.

In light of these principles, we now turn to certain embodiments.

In accordance with some embodiments, a device includes a first optical element configured to receive first light in a first direction (e.g., polarization conversion device 100 includes optical element 102-1 receiving light 109-1 in a first direction in FIG. 1A). The first light includes a first component having a first circular polarization (e.g., light 111-1) and a second component having a second circular polarization distinct from the first polarization (e.g., light 110-1). The first optical element is also configured to convert the first component of the first light into second light having the second circular polarization and output the second light in a second direction distinct from the first direction (e.g., optical element 102-1 converts light 111-1 to light 111-2 having a second direction and the second polarization). The first optical element is further configured to convert the second component of the first light into third light having the first circular polarization and output the third light in a third direction distinct from the first direction and the second direction (e.g., optical element 102-1 converts light 110-1 to light 110-2 having a third direction and the first polarization). The device also includes a second optical element optically coupled with the first optical element (e.g., optical element 104-1). The second optical element is configured to receive the second light having the second circular polarization in the second direction (e.g., light 111-2) and transmit the second light. The second optical element is also configured to receive the third light having the first circular polarization in the third direction (e.g., light 110-2), and convert to the third light into fourth light having the second circular polarization (e.g., optical element 102-2 converts light 110-2 to light 110-3 having the second polarization).

In some embodiments, the second optical element is configured to output the fourth light in the second direction (e.g., optical element 104-1 directs light 110-3 to the second direction in FIG. 1A).

In some embodiments, the first optical element and the second optical element are diffraction gratings (e.g., optical elements 102-1 and 104-1 are diffraction gratings in FIG. 1A).

In some embodiments, the first optical element and the second optical element are axicons (e.g., optical elements 102-2 and 104-2 are axicons in FIG. 1A).

In some embodiments, the first optical element and the second optical element are lenses (e.g., optical elements 102-1 and 104-1 are lenses in FIG. 1A).

In some embodiments, the first optical element is a diffraction grating and the second optical component is a lens (e.g., optical element 102-1 is a diffraction grating and optical element 104-1 is a lens in FIG. 1A). In some embodiments, the first optical element is an axicon and the second optical component is a diffraction grating (e.g., optical element 102-3 is an axicon and optical element 104-3 is a diffraction grating in FIG. 1C).

In some embodiments, the second direction corresponds to +1st order diffraction of the first component of the first light and the third direction correspond to −1st order diffraction of the second component of the first light (e.g., light 111-2 is directed to +1st order diffraction of light 109-1 and light 110-2 is directed to the −1st order diffraction of light 109-1 in FIG. 1A).

In some embodiments, the light received by the first optical element in the first direction has a first beam size (e.g., light 109-1 has beam size D1 in FIG. 1A) and the light transmitted by the second optical element in the second direction has a second beam size (e.g., light 109-2 has beam size D2), the second beam size being larger than the first beam size. In some embodiments, the second beam size is smaller than the first beam size.

In some embodiments, the first optical element is a geometric phase optical element (e.g., optical element 102-1 in FIG. 1A is a geometric phase lens 200 described with respect to FIGS. 2A-2D, geometric phase axicon 210 described with respect to FIGS. 2E-2H or geometric phase grating 300 described with respect to FIGS. 3A-3D).

In some embodiments, the second optical element is a polarizing volume hologram element (e.g., optical element 104-1 in FIG. 1A is PVH lens 400 described with respect to FIGS. 4A-4D, PVH axicon 420 described above with respect to FIG. 420, or PVH grating 500 described with respect to FIGS. 5A-5D).

In some embodiments, the device further includes a third optical element optically coupled with the second optical element (e.g., optical element 106-1 in FIG. 1A). The third optical element is configured to receive the second light and the fourth light, and to convert the second light into fifth light and the fourth light into sixth light. The third optical element is further configured to output the fifth light and the sixth light in a fourth direction (e.g., optical element 106-1 steers light 111-2 from the second direction to a fourth direction and optical element 106-1 steers light 110-3 from the second direction to the fourth direction). In some embodiments, the third optical element is a lens, an axicon or a diffraction grating (e.g., optical element 106-1 is a lens, an axicon and a diffraction grating). In some embodiments, the third optical element is a geometric phase optical element. In some embodiments, the second optical element is a polarizing volume hologram element.

In some embodiments, the fourth direction corresponds (e.g., is parallel to, or nearly parallel to) to the first direction (e.g., optical element 106-1 steers light 111-3 and light 110-4 to the first direction in FIG. 1A).

In some embodiments, the fifth light (e.g., light 111-2 in FIG. 1A) has the first polarization and the sixth light has the first polarization (e.g., light 110-3 in FIG. 1A).

In some embodiments, the light received by the first optical element has a first divergence and the light transmitted from the third optical element has a second divergence that corresponds to the first divergence (e.g., light 109-1 and light 109-2 are both collimated, i.e., have a low divergence in FIG. 1A). In some embodiments, the light received by the first optical element and the light transmitted from the third optical element are collimated (e.g., light 109-1 and light 109-2 are collimated).

In some embodiments, the first optical element is a first lens with a first focal length f1 (e.g., optical element 102-4 in FIG. 1B), the second optical element is a second lens with a second focal length f2 (e.g., optical element 104-4 in FIG. 1B), and the third optical element is a third lens with a third focal length f3 (e.g., optical element 106-4 in FIG. 1B). The second and the third focal lengths are selected so that the device has a zero optical power (e.g., polarization conversion device 100 has a zero optical power in FIG. 1A).

In some embodiments, the second focal length f2 corresponds to −f1/2 and the third focal length f3 corresponds to −f1 (e.g., FIG. 1B).

In accordance with some embodiments, a method (e.g., a method illustrated in FIG. 1A) includes receiving, with a first optical element, light in a first direction. The light includes a first component having a first circular polarization and a second component having a second circular polarization distinct from the first polarization. The method also includes converting, with the first optical element, the first component of the first light into second light having the second circular polarization and outputting the first component in a second direction distinct from the first direction. The method further includes converting, with the first optical element, the second component of the first light into third light having the first circular polarization and outputting the third light in a third direction distinct from the first direction and the second direction. The method also includes receiving, with a second optical element optically coupled with the first optical element, the second light having the second circular polarization in the second direction and transmitting the second light. The method further includes receiving, with the second optical element, the third light having the first circular polarization in the third direction and converting the third light into fourth light having the second circular polarization.

In some embodiments, the method includes outputting the fourth light in the second direction (e.g., FIG. 1A).

In some embodiments, the first optical element is a geometric phase optical element (e.g., FIGS. 2A-2D or FIGS. 3A-3D).

In some embodiments, the second optical element is a polarizing volume hologram element (e.g., FIGS. 4A-4D or FIGS. 5A-5D).

In some embodiments, the method includes receiving, with a third optical element optically coupled with the second optical element, the second light and the fourth light, and to convert the second light into fifth light and the fourth light into sixth light, wherein the third optical element is further configured to output the fifth light and the sixth light in a fourth direction (e.g., FIG. 1A).

In some embodiments, the fourth direction corresponds to (e.g., is parallel to, or nearly parallel to) the first direction (e.g., FIG. 1A).

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A device, comprising:
    a first optical element configured to
        (i) receive first light in a first direction, the first light including a first component having a first circular polarization and a second component having a second circular polarization distinct from the first circular polarization,
        (ii) convert the first component of the first light into second light having the second circular polarization and output the second light in a second direction distinct from the first direction, and
        (iii) convert the second component of the first light into third light having the first circular polarization and output the third light in a third direction distinct from the first direction and the second direction; and
    a second optical element optically coupled with the first optical element, the second optical element configured to
        (i) receive the second light having the second circular polarization in the second direction and transmit the second light, and
        (ii) receive the third light having the first circular polarization in the third direction and convert the third light into fourth light having the second circular polarization.

2. The device of claim 1, wherein:
    the second optical element is configured to output the fourth light in the second direction.

3. The device of claim 1, wherein the first optical element is a geometric phase diffraction grating and the second optical element is a polarization volume holographic diffraction grating.

4. The device of claim 1, wherein the first optical element is a geometric phase axicon and the second optical element is a polarization volume holographic axicon.

5. The device of claim 1, wherein the first optical element is a geometric phase lens and the second optical element is a polarization volume holographic lens.

6. The device of claim 1, wherein the second direction corresponds to +1st order diffraction of the first component of the first light and the third direction correspond to −1st order diffraction of the second component of the first light.

7. The device of claim 1, wherein the light received by the first optical element in the first direction has a first beam size and the light transmitted by the second optical element in the second direction has a second beam size, the second beam size being larger than the first beam size.

8. The device of claim 1, wherein the first optical element is a geometric phase optical element.

9. The device of claim 8, wherein the second optical element is a polarizing volume hologram element.

10. The device of claim 1, further comprising:
    a third optical element optically coupled with the second optical element, the third optical element configured to receive the second light and the fourth light, and to convert the second light into fifth light and the fourth light into sixth light, wherein the third optical element is further configured to output the fifth light and the sixth light in a fourth direction.

11. The device of claim 10, wherein the fourth direction corresponds to the first direction.

12. The device of claim 10, wherein the fifth light has the first polarization and the sixth light has the first polarization.

13. The device of claim 10, wherein:
    the light received by the first optical element has a first divergence; and the light transmitted from the third optical element has a second divergence that corresponds to the first divergence.

14. The device of claim 10, wherein:
the first optical element is a first lens with a first focal length f1, the second optical element is a second lens with a second focal length f2, and the third optical element is a third lens with a third focal length f3, wherein the first, the second and the third focal lengths are selected so that the device has a zero optical power.

15. The device of claim 14, wherein:
the second focal length f2 corresponds to −f1/2 and the third focal length f3 corresponds to −f1.

16. A method, comprising:
with a first optical element:
  (i) receiving first light in a first direction, the light including a first component having a first circular polarization and a second component having a second circular polarization distinct from the first circular polarization;
  (ii) converting the first component of the first light into second light having the second circular polarization and outputting the first component in a second direction distinct from the first direction; and
  (iii) converting the second component of the first light into third light having the first circular polarization and outputting the third light in a third direction distinct from the first direction and the second direction; and
with a second optical element optically coupled with the first optical element:
  (i) receiving the second light having the second circular polarization in the second direction and transmitting the second light; and
  (ii) receiving the third light having the first circular polarization in the third direction, converting the third light into fourth light having the second circular polarization.

17. The method of claim 16, including outputting the fourth light in the second direction.

18. The method of claim 16, wherein the first optical element is a geometric phase optical element.

19. The method of claim 18, wherein the second optical element is a polarizing volume hologram element.

20. The method of claim 16, including:
with a third optical element optically coupled with the second optical element, receiving the second light and the fourth light, and to convert the second light into fifth light and the fourth light into sixth light, wherein the third optical element is further configured to output the fifth light and the sixth light in a fourth direction.

* * * * *